United States Patent
Kondo

(10) Patent No.: US 6,779,509 B1
(45) Date of Patent: Aug. 24, 2004

(54) THROTTLE VALVE CONTROL APPARATUS

(75) Inventor: Shigeki Kondo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/678,261

(22) Filed: Oct. 6, 2003

(30) Foreign Application Priority Data

May 15, 2003 (JP) ........................................ 2003-137375

(51) Int. Cl.$^7$ ............................................... F02D 7/00
(52) U.S. Cl. ........................ 123/399; 123/396; 123/361
(58) Field of Search ................................. 123/396, 399, 123/376, 403, 696, 361

(56) References Cited

U.S. PATENT DOCUMENTS 5,906,185 A * 5/1999 Ishida et al. ................. 123/399
6,318,337 B1 * 11/2001 Pursifull ...................... 123/396

FOREIGN PATENT DOCUMENTS

JP 7-293284 A 11/1995
JP 10-176579 A 6/1998

* cited by examiner

*Primary Examiner*—Mahmoud Gimie
(74) *Attorney, Agent, or Firm*—Sughrue Mion, PLLC

(57) ABSTRACT

To provide a throttle valve control apparatus which simultaneously realizes quick response and stability even when the throttle valve gets stuck in its operation. The apparatus conducts control where a small control coefficient is used to emphasize the convergence stability when the deviation is large. In addition, the apparatus includes a coefficient limiting unit (14) which can gradually increase the control coefficients based on the predetermined permissible changes as the deviation decreases with the elapse of time. This enables the throttle valve control apparatus which simultaneously realizes the quick response and stability by using the controlled variable calculated from the gradually increased control coefficients to drive the throttle valve even when the throttle valve gets stuck, and its motion encounters an obstruction.

6 Claims, 11 Drawing Sheets

THROTTLE VALVE CONTROL APPARATUS

BACKGROUND OF THE INVENTION

1. Field of the Invention

The present invention relates to a throttle valve control apparatus which conducts so-called electronic throttle control where a throttle valve of an internal combustion engine is controlled to attain a required opening determined using additional information as well as an accelerator operation quantity instead of driver's operating an accelerator, thereby directly controlling the throttle valve.

2. Description of the Related Art

As a conventional throttle valve control apparatus, a throttle valve control apparatus which simultaneously realizes quick response when a deviation between a required opening and an actual opening of a throttle valve is small, and convergence stability when the deviation is large is disclosed (for example, see JP 10-176579).

In the related art, a map is prepared which sets a larger value to the proportional gain and the integral gain as the deviation becomes smaller, both of the gains are temporarily determined by referring to the map for a given deviation in a transient state, the temporary gains and gains used in the previous cycle are compared, thereby selecting the smaller gains of them, and a driver signal is calculated based on the selected gains. Thus, since large gains are used when the deviation is small, proper follow-up is provided. Also, since small gains provided for a large deviation are still used for the control after the deviation becomes small, an overshoot is not generated by an excessive driving force.

Meanwhile, the related art has the following problems. There is no trouble when the throttle valve operates ideally according to the drive signal. However, when the motion of the throttle valve encounters an obstruction, such as getting stuck, while in a transient state, since the control coefficient is fixed to a control coefficient corresponding to a large deviation, namely a small control coefficient, the drive signal remains small. Consequently, the throttle valve does not operate until the integral term becomes large, and eventually it starts operating after the integral term becomes large. As a result, the response of the throttle opening becomes fairly degraded.

SUMMARY OF THE INVENTION

The present invention is devised to solve the problems described above, and provides a throttle valve control apparatus which simultaneously realizes quick response and stability even when the throttle valve gets stuck in its operation.

A throttle valve control apparatus according to the present invention includes:

- a deviation calculating unit which calculates a deviation between a target opening and an actual opening of a throttle valve;
- a reference unit which outputs a control coefficient for the individual deviation;
- a temporarily determining unit which refers to the reference unit at a predetermined interval so as to temporarily determine a temporary control coefficient corresponding to the deviation;
- a coefficient limiting unit which determines an actual control coefficient for the present period based on comparing the temporary control coefficient temporarily determined by the temporarily determining unit, with a stored actual control coefficient determined for the previous period;
- a present value storing unit which stores the actual control coefficient determined by the coefficient limiting unit; and
- a drive signal determining unit which determines a drive signal for the throttle valve based on the actual control coefficient obtained from the coefficient limiting unit and the deviation obtained from the deviation calculating unit, in which the coefficient limiting unit has a permissible change predetermined for the change of the control coefficient which changes for a single period, obtains a difference as a change between the temporary control coefficient temporarily determined by the temporarily determining unit and the actual control coefficient for the previous period stored in the present value storing unit at predetermined periods, and limits the obtained change according to the permissible change so as to determine the actual control coefficient for the present period, thereby fitting the change from the actual control coefficient for the previous period to the actual control coefficient for the present period into the permissible change.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

First Embodiment

Figure 1:
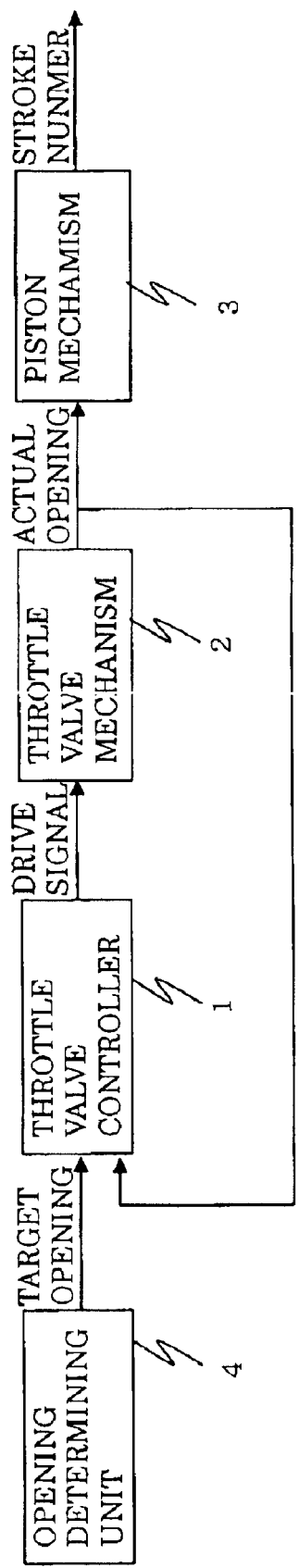
FIG. 1 is a system block diagram for a throttle valve control apparatus according to a first embodiment of the present invention.

The following section describes embodiments of the present invention referring to drawings. FIG. 1 is a system block diagram for a throttle valve control apparatus according to a first embodiment of the present invention. An opening determining unit 4 outputs a target opening as a reference signal. The target opening is determined according to additional information such as engine coolant temperature and the number of revolutions in the engine as well as the accelerator operation.

A throttle valve controller 1 is a control unit which calculates a drive signal based on a signal for an actual opening obtained as a feed back signal from a throttle valve mechanism 2, and the target opening obtained from the opening determining unit 4, and supplies the throttle valve mechanism 2 with the calculated drive signal. PID control is applied as the control method, and a sampling control system which executes the calculation at a certain interval is adopted.

The throttle valve mechanism 2 includes a throttle valve for adjusting an intake resistance of an intake pipe which is an intake air passage to an engine, a motor, and an opening detecting sensor (not shown). The motor receives the drive signal from the throttle valve controller 1, and drives the throttle valve, thereby changing the opening of the throttle valve. In addition, the actual opening is detected by the opening detecting sensor, and is fed back to the throttle valve controller 1 as a signal for the actual opening.

Intake air whose quantity corresponds to the actual opening of the throttle valve is taken into the piston mechanism 3, a piston moves according to the intake air amount, and consequently, the engine rotates.

Figure 2:
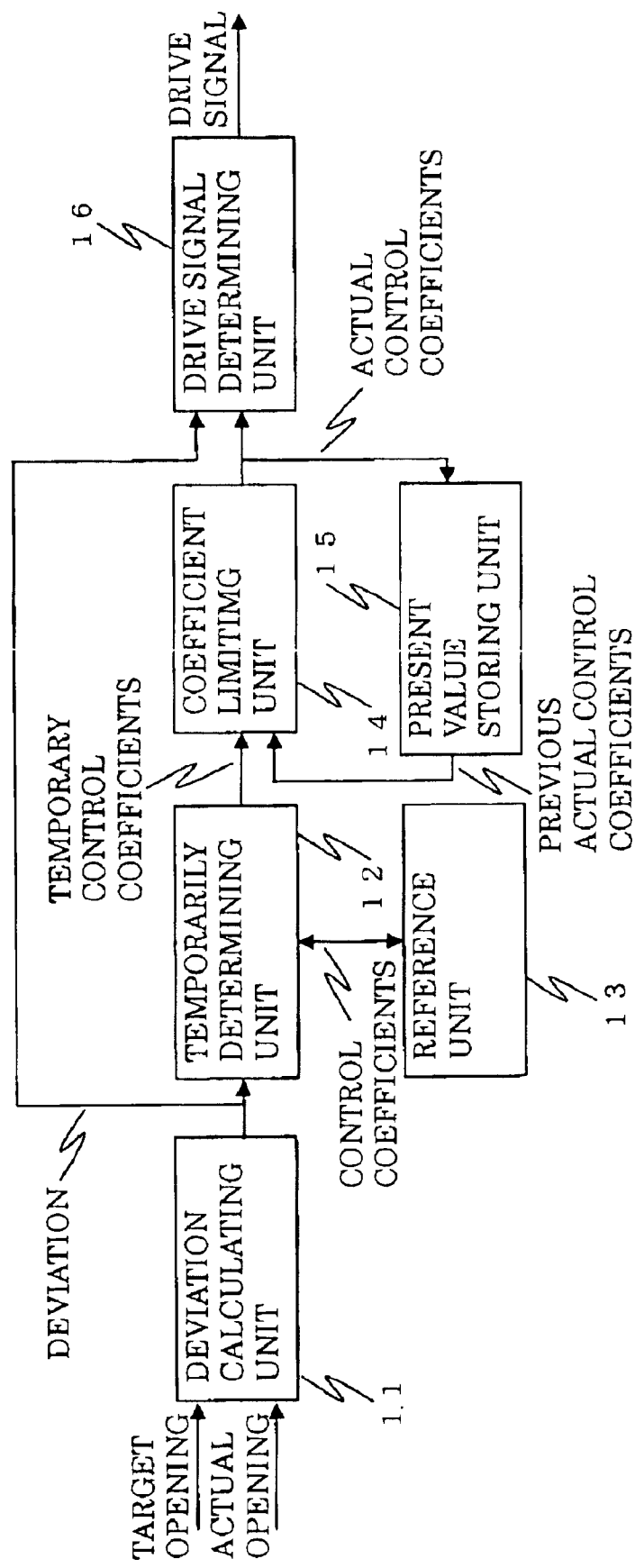
FIG. 2 is an internal block diagram of a throttle valve controller according to the first embodiment of the present invention.

The following section describes the control of the throttle valve executed by the throttle valve controller 1. FIG. 2 is an internal block diagram of the throttle valve controller 1 according to the first embodiment of the present invention, and shows a flow of processing inside the throttle valve controller.

First, a deviation calculating unit 11 uses the signal for the target opening obtained from the opening determining unit 4 as a reference, and calculates a deviation of the signal for the actual opening obtained from the throttle valve mechanism 2 with respect to the reference. The PID control is conducted based on the deviation. Since the differential term D is not characteristic in the present invention, the differential term D is not considered in the following description, and detailed description is provided for how to select the proportional term P and the integral term I.

Then, according to a deviation signal obtained from the deviation calculating unit 11 and candidates of the control coefficients obtained from a reference unit 13 based on the obtained deviation signal, a temporarily determining unit 12 temporarily determines temporary control coefficients corresponding to the deviation signal, and description for how to temporarily determine the temporary control coefficients is detailed below. A proportional gain corresponding to the control coefficient of the proportional term P, and an integral gain corresponding to the control coefficient of the integral term I are prepared in terms of the deviation in advance as a map in the reference unit 13.

Figure 3:
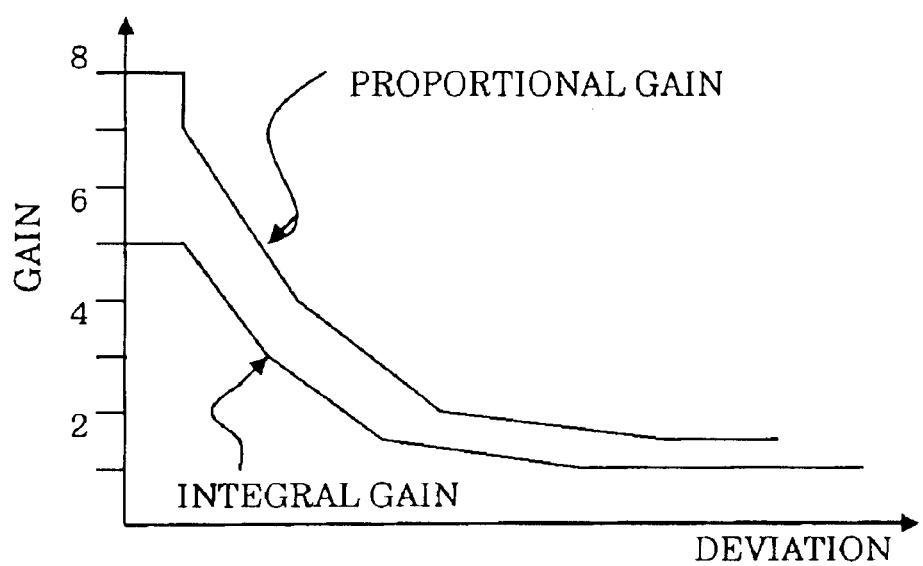
FIG. 3 shows the relationship between a deviation and a corresponding proportional gain, and the relationship between the deviation and a corresponding integral gain respectively.

FIG. 3 shows the relationship between the deviation and the proportional gain, and the relationship between the deviation and the integral gain respectively. To increase the response for a small deviation, the proportional gain is set large for the small deviation. This arrangement also holds true with the integral gain. Based on this chart, the data on proportional gain and the integral gain corresponding to predetermined deviation data are stored in the reference unit 13 as a map. In FIG. 3, the proportional gain and the integral gain are respectively poly-line approximated using multiple inflection points, and these inflection points may be used as predetermined deviation data.

The temporarily determining unit 12 uses the deviation data obtained from the deviation calculating unit 11 to obtain data on proportional gains and integral gains corresponding to deviation data on inflection points on both ends of line segments approximating the deviation data from the reference unit 13. Then, the proportional gain and the integral gain corresponding to the deviation data obtained from the deviation calculating unit 11 are linearly interpolated based on the data obtained from the reference unit 13, and temporary coefficients are temporarily determined.

Then, a coefficient limiting unit 14 obtains actual control coefficients actually supplied in the present sampling based on the temporary control coefficients obtained from the temporarily determining unit 12, and previous actual control coefficients obtained from a present value storing unit 15, and used as the actual control coefficients in the previous sampling. How to determine the actual control coefficients is detailed below.

First, the present value storing unit 15 stores the actual control coefficients actually output from the coefficient limiting unit 14 in the last sampling period. The stored actual control coefficients are used by the coefficient limiting unit 14 to determine the actual control coefficients in the next sampling period.

The coefficient limiting unit 14 determines the actual control coefficients in the present sampling period based on comparison between the temporary control coefficients obtained from the temporarily determining unit 12 and the actual control coefficients in the previous sampling period stored in the present value storing unit 15. If the larger control coefficient is selected based on the comparison between both of them, an overshoot is induced when the deviation is large. On the other hand, if the smaller control coefficient is selected based on the comparison between both of them, though the convergence stability for a large deviation is improved, the response degrades when the throttle valve gets stuck.

Therefore, the coefficient limiting unit 14 is improved such that it increases the control coefficients as the time elapses, thereby preventing the response from degrading even when the throttle valve gets stuck. The coefficient limiting unit 14 sets a permissible value by which the control coefficient can increase in a single sampling period as a permissible increment, and a permissible value by which the control coefficient can decrease in a single sampling period as a permissible decrement in advance. Then, the change of the control coefficients in a single sampling period is limited by the permissible increment and the permissible decrement to obtain the actual coefficients, thereby preventing the response from degrading even when the throttle valve gets stuck.

Figure 4:
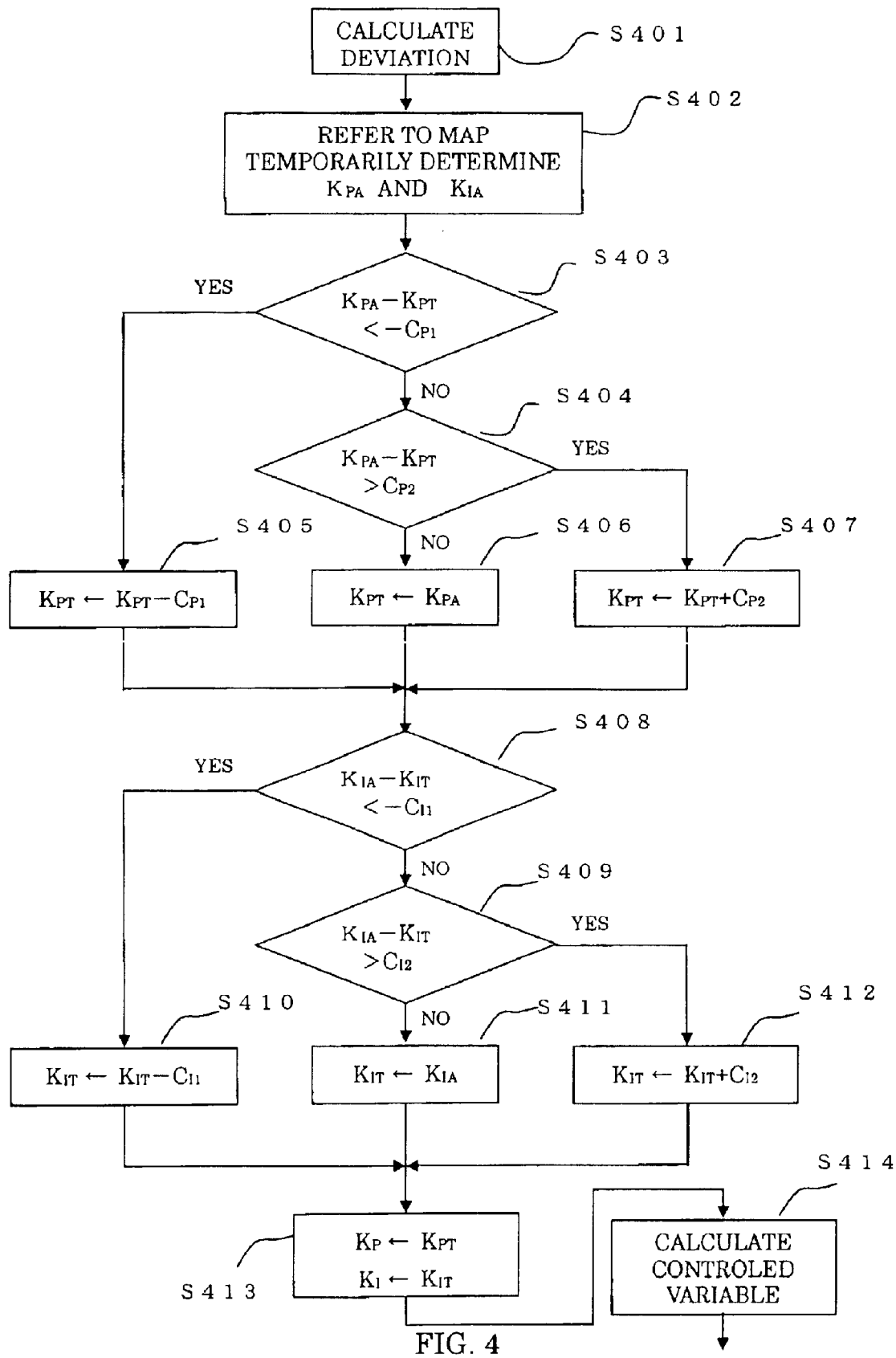
FIG. 4 is a flowchart relating to how to determine the control coefficients according to the first embodiment of the present invention.

FIG. 4 is a flowchart relating to how to determine the control coefficients according to the first embodiment of the present invention. The following section considers a case where the target opening changes stepwise from a stable state where the target opening and the actual opening of the throttle match. First, the deviation calculating unit 11 calculates the deviation between the target opening and the actual opening of the throttle valve (S401). Then, the temporarily determining unit 12 temporarily determines the proportional gain $K_{PA}$ and the integral gain $K_{IA}$ based on the obtained deviation data, and the data map for the proportional gain and the integral gain stored in the reference unit 13 (S402).

Then, the proportional gain is determined first. A proportional gain permissible decrement $C_{P1}$ and a proportional gain permissible increment $CP_2$ are set as the permissible changes of the proportional gain per sampling period in advance in the coefficient limiting unit 14. The coefficient limiting unit 14 determines whether a value obtained by subtracting $K_{PT}$ stored in the present value storing unit 15 and used as the actual proportional gain in the last sampling, from the proportional gain $K_{PA}$ temporarily determined by the temporarily determining unit 12 is smaller than $-C_{P1}$ (S403). That is, when the proportional gain decreases, it is determined whether the quantity of the change is within the proportional gain permissible decrement $C_{P1}$.

In S403, when the decrement of the proportional gain exceeds the permissible decrement, the coefficient limiting unit 14 sets the $K_{PT}-C_{P1}$ to $K_{PT}$ as a new proportional gain, and restrains the decrement of the proportional gain in a single sampling period to the proportional gain permissible decrement $C_{P1}$ (S405). On the other hand, in S403, when the decrement of the proportional gain is within the permissible decrement, it is determined whether $K_{PA}-K_{PT}$ is larger than $C_{P2}$ (S404). That is, when the proportional gain increases, it is determined whether the quantity of the change is within the proportional gain permissible increment $C_{P2}$.

In S404, when the increment of the proportional gain exceeds the permissible increment, the coefficient limiting unit 14 sets the $K_{PT}+_{P2}$ to $K_{PT}$ as a new proportional gain, and restrains the increment of the proportional gain in a single sampling period to the proportional gain permissible decrement $C_{P2}$ (S407). On the other hand, in S404, when the increment of the proportional gain is within the permissible increment, it is determined that the temporarily determined proportional gain $K_{PA}$ is within the permissible change, and $K_{PA}$ is set to $K_{PT}$ as the proportional gain (S406).

After the proportional gain is determined, the integral gain is determined next. An integral gain permissible decrement $C_{I1}$, and an integral gain permissible increment $C_{I2}$ are set as the permissible changes of the integral gain per sampling period in advance in the coefficient limiting unit 14. The coefficient limiting unit 14 determines whether a value obtained by subtracting $K_{IT}$ stored in the present value storing unit 15, and used as the actual integral gain in the last sampling from the integral gain $K_{IA}$ temporarily determined by the temporarily determining unit 12 is smaller than $-C_{I1}$ (S408). That is, when the integral gain decreases, it is determined whether the quantity of the change is within the integral gain permissible decrement $C_{I1}$.

In S408, when the decrement of the integral gain exceeds the permissible decrement, the coefficient limiting unit 14 sets the $K_{IT}-C_{I1}$ to $K_{IT}$ as a new integral gain, and restrains the decrement of the integral gain in the single sampling period to the integral gain permissible decrement $C_{I1}$ (S410). On the other hand, in S408, when the decrement of the integral gain is within the permissible decrement, it is determined whether $K_{IA}-K_{IT}$ is larger than $C_{I2}$ (S409). That is, when the integral gain increases, it is determined whether the quantity of the change is within the integral gain permissible increment $C_{I2}$.

In S409, when the increment of the integral gain exceeds the permissible increment, the coefficient limiting unit 14 sets the $K_{IT}+C_{I2}$ to $K_{IT}$ as a new integral gain, and restrains the increment of the integral gain in the single sampling period to the integral gain permissible increment $C_{I2}$ (S412).

On the other hand, in S409, when the increment of the integral gain is within the permissible increment, it is determined that the temporarily determined integral gain $K_{PA}$ is within the permissible change, and $K_{IA}$ is set to $K_{IT}$ as the integral gain (S411).

The proportional gain $K_{PT}$ and the integral gain $K_{IT}$ determined in these steps described above are stored in the present value storing unit 15. In addition, the proportional gain $K_{PT}$ and the integral gain $K_{IT}$ are set to the actual proportional gain $K_P$ and the actual integral gain $K_I$ respectively (S413). The coefficient limiting unit 14 passes these gains to a drive signal determining unit 16 as the actual control coefficients. The drive signal determining unit 16 calculates a controlled variable based on the deviation obtained from the deviation calculating unit 11 and the actual control coefficients obtained from the coefficient limiting unit 14 (S414).

The main objective of applying the limits of the proportional gain permissible decrement $C_{P1}$ and the proportional gain permissible increment $C_{P2}$ to the change in the proportional gain is to prevent instability of the control due to a sudden increase of the proportional gain. Therefore, though $C_{P1}=C_{P2}$ may be possible, it may also be possible to set as $C_{P1}>C_{P2}$ so that the permissible decrement is larger than the permissible increment.

With this setting, when the deviation between the required opening and the actual opening increases suddenly, it is possible to prevent the overall controlled variable from increasing excessively by decreasing the proportional gain quickly. Then, additionally, an overshoot is restrained, and thus, the control is stabilized by applying the limit to the permissible changes as the deviation decreases as a result of the control. The same applies to the integral gain.

Figure 5:
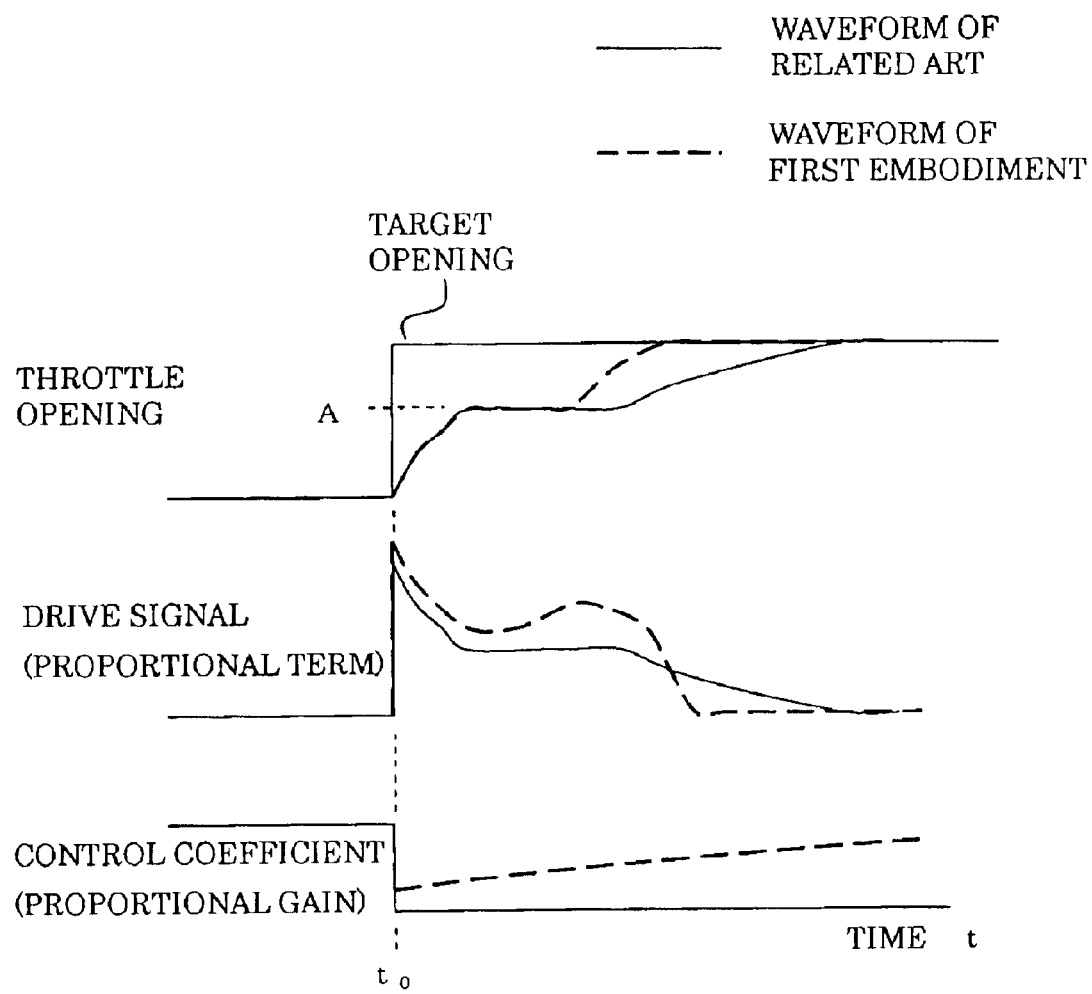
FIG. 5 shows improvement in control response by means of the proportional gain when a throttle valve gets stuck.
Figure 6:
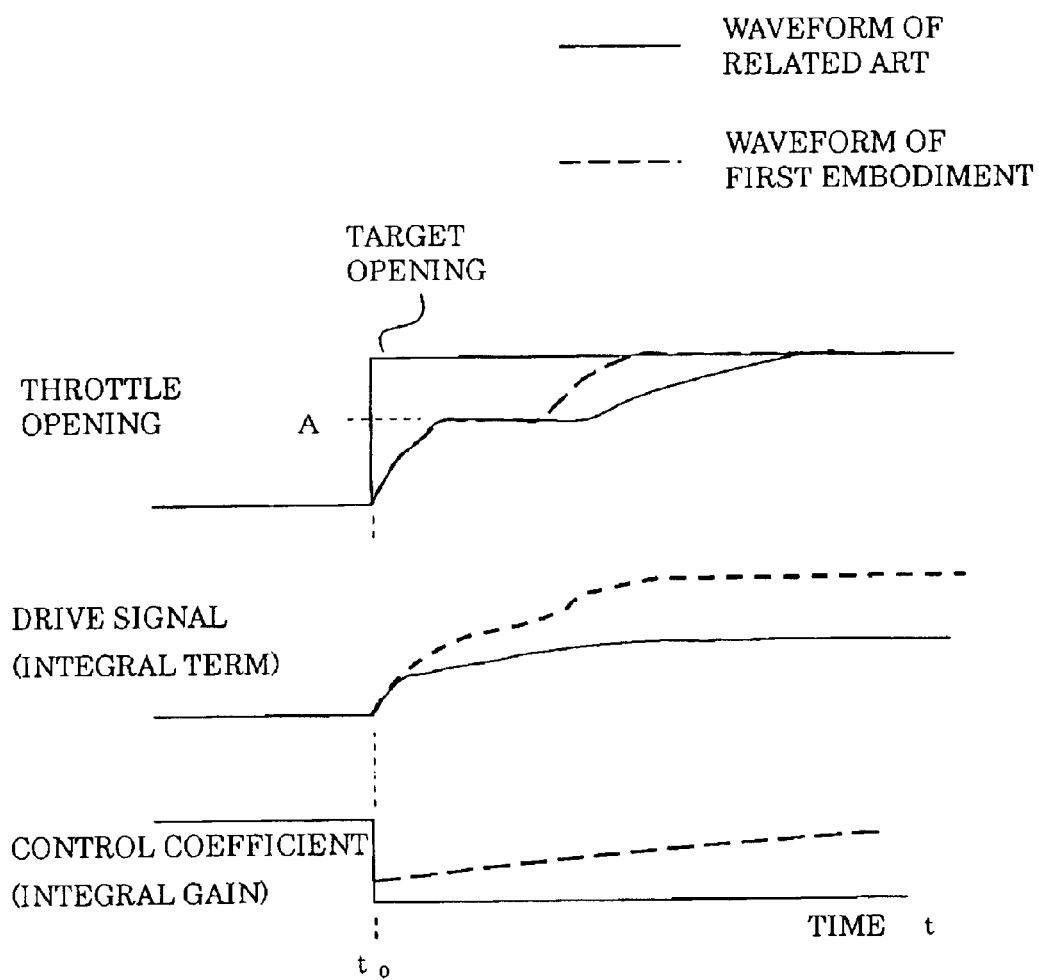
FIG. 6 shows improvement in control response by means of the integral gain when the throttle valve gets stuck.

The following section describes control response when the throttle valve gets stuck referring to FIG. 5 and FIG. 6. FIG. 5 shows improvement in the control response by means of the proportional gain when the throttle valve gets stuck. FIG. 6 shows improvement in control response by means of the integral gain when the throttle valve gets stuck. The throttle valve gets stuck at a point A in terms of the throttle opening in FIG. 5 and FIG. 6.

FIG. 5 shows changes in actual throttle opening, the drive signal for the proportional term, and the proportional gain when the target opening changes stepwise. Solid lines indicate waveforms according to the related art, and broken lines indicate waveforms according to the first embodiment of the present invention. By determining the proportional gain based on the method detailed in FIG. 4, the proportional gain increases gradually within the permissible increment of the proportional gain in every sampling period as time elapses after the target opening changes. As a result, even at the point A where the throttle valve gets stuck, as a result of the increase of the drive signal due to the increase of the proportional gain, a response which enables exiting from the sticking state quickly and approaching the target opening is obtained.

FIG. 6 shows changes in actual throttle opening, the drive signal for the integral term, and the integral gain when the target opening changes stepwise. Solid lines indicate waveforms according to the related art, and broken lines indicate waveforms according to the first embodiment of the present invention. By determining the integral gain based on the method detailed in FIG. 4, the integral gain increases gradually within the permissible increment of the integral gain in every sampling period as time elapses after the target opening changes. As a result, even at the point A where the throttle valve gets stuck, the number of the drive signals for the integral term increases more quickly than the conventional method due to the increase of the integral gain, and a response which enables exiting from the stick quickly and approaching the target opening is obtained.

While the permissible increment and the permissible decrement for the change in the control coefficients in a single sampling period are described as fixed values in the first embodiment, they may be functions of time, and it is possible to improve the response and the stability by changing the permissible increment and the permissible decrement according to the convergence of the control response.

With the first embodiment, it is possible to conduct control where a large control coefficient is used to increase the response when the deviation is small, and a small control coefficient is used to emphasize the convergence stability when the deviation is large. In addition, the first embodiment has the feature which gradually increases the control coefficients based on the predetermined permissible changes as the deviation decreases with the elapse of time when the deviation is large. This feature enables the throttle valve control apparatus which simultaneously realizes the quick response and stability by using the controlled variable calculated from the gradually increased control coefficients to drive the throttle valve even when the throttle valve gets stuck, and thus, its motion encounters an obstruction.

Second Embodiment

In the first embodiment, the change of the control coefficients in a single sampling period is limited. As a second embodiment, description is provided for a method where upper and lower limits of the control coefficients are set as functions of time in advance, and when a deviation larger than a certain value occurs, the upper and lower limits based on the functions of time are applied to the temporary control coefficients determined by the temporarily determining unit 12, thereby limiting the control coefficients.

Figure 7:
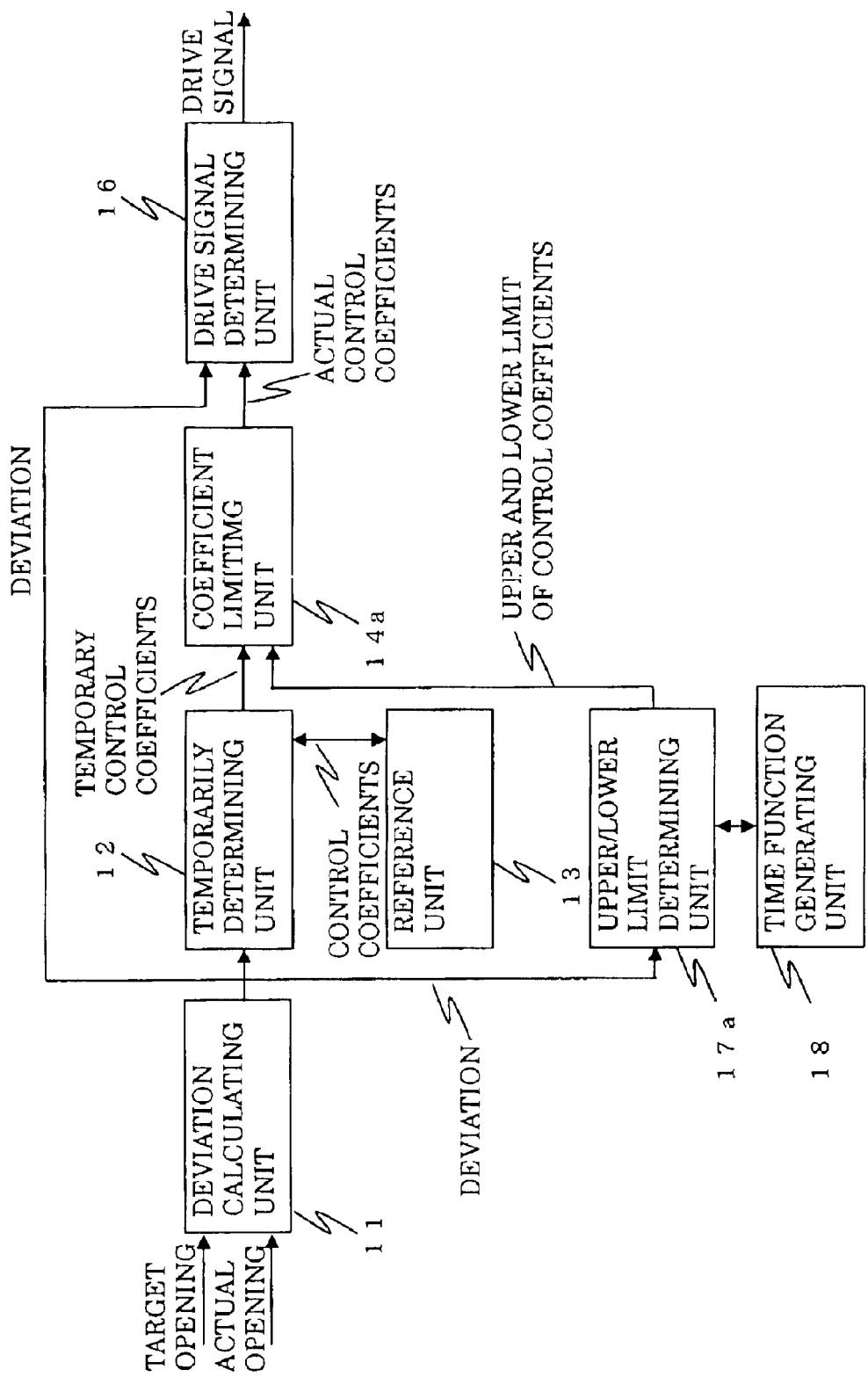
FIG. 7 is an internal block diagram of a throttle valve controller according to a second embodiment of the present invention.

FIG. 7 is an internal block diagram of the throttle valve controller 1 according to the second embodiment of the present invention, and shows a flow of processing inside the throttle valve controller. The same units as those in the internal block diagram of FIG. 2 used for describing the first embodiment are assigned with the same reference numerals, and new constitution elements are detailed.

Figure 8:
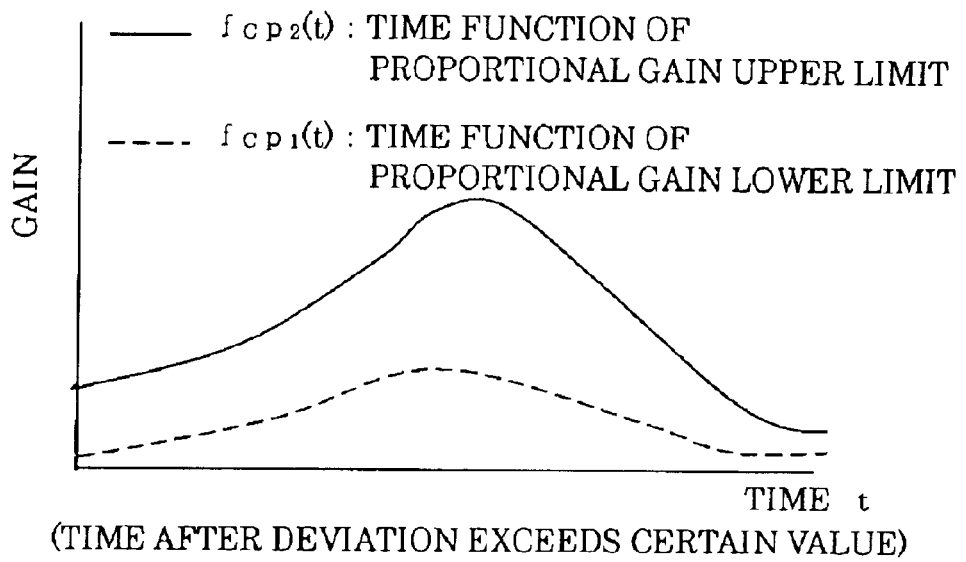
FIG. 8 shows time functions for upper and lower limits of the proportional gain according to the second embodiment of the present invention.

An upper/lower limit determining unit 17a obtains candidates for the upper and lower limits of the control coefficients from a time function generating unit 18 based on the deviation signal obtained from the deviation calculating unit 11, determines the upper and lower limits of the control coefficients based on the candidates to be outputted to the coefficient limiting unit 14a. FIG. 8 shows the time functions for the upper and lower limits of the proportional gain according to the second embodiment of the present invention. Based on this chart, data on the upper and lower limits of the proportional gain corresponding to predetermined elapsed time data are stored as a map in a time function generating unit 18. For example, the curves for the upper and lower limits in FIG. 8 are poly-line approximated by multiple inflection points, and these inflection points are arranged into a map as the predetermined elapsed time data. Alternatively, the time function generating unit 18 may have continuous functions which generate the upper and lower limits according to the elapsed time.

Though FIG. 8 does not show, time functions for upper and lower limits of the integral gain are arranged as a map, and are stored in the time function generating unit 18 in advance as the time functions for the proportional gain are. An upper/lower limit determining unit 17a stores in advance a deviation threshold which is used to determine that the elapsed time for the time functions is 0 second after the deviation exceeds a certain value.

The upper/lower limit determining unit 17a has a feature which compares the deviation obtained from the deviation calculating unit 11 and a deviation threshold stored in advance, resets the elapsed time to 0 second when a deviation larger than the deviation threshold is input, and starts measuring the elapsed time. Further, the upper/lower limit determining unit 17a uses the elapsed time data to obtain data on the upper limits and the lower limits of the proportional gain corresponding to the elapsed time data on inflection points on both ends of a line segment approximating the elapsed time data from the time function generating unit 18. Then, the upper and lower limits of the proportional gain are determined by applying linear interpolation so as to obtain data on the upper limit and the lower limit of the proportional gain corresponding to the elapsed time data based on the obtained data. Similarly, upper and lower limits of the integral gain are determined. The upper and lower limits of the control coefficients are sent to the coefficient limiting unit 14a.

Then, a coefficient limiting unit 14a applies the upper and lower limits of the control coefficients obtained from the upper/lower limit determining unit 17a to limit the temporary control coefficients obtained from the temporarily determining unit 12, and obtains actual control coefficients to be actually output. Though FIG. 8 does not show, by changing the upper and lower limits after a certain period, namely increasing the upper limits and decreasing the lower limits, it is possible to adopt large temporary control coefficients temporarily determined by the temporarily determining unit 12 when a small deviation occurs after a deviation subsides.

Figure 9:
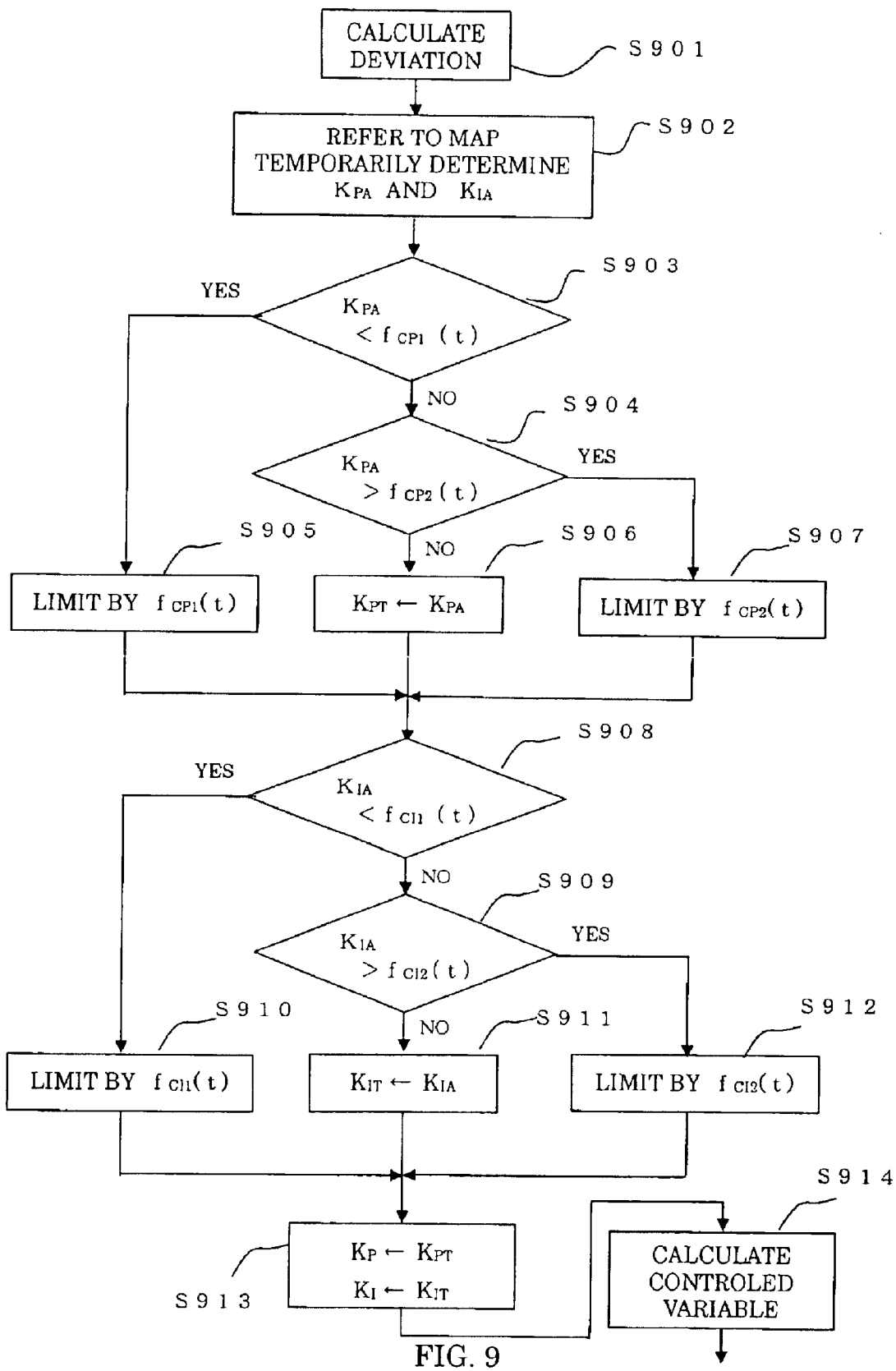
FIG. 9 is a flowchart relating to how to determine the control coefficients according to the second embodiment of the present invention.

FIG. 9 is a flowchart relating to how to determine the control coefficients according to the second embodiment of the present invention. The following section considers a case where the target opening changes stepwise from a stable state where the target opening and the actual opening match. First, the deviation calculating unit 11 calculates the deviation between the target opening and the actual opening of the throttle valve (S901). Then, the temporarily determining unit 12 temporarily determines the proportional gain $K_{PA}$ and the integral gain $K_{IA}$ based on the obtained deviation data, and the data map for the proportional gain and the integral gain stored in the reference unit 13 (S902).

Then, the proportional gain is first determined. The coefficient limiting unit 14a obtains a proportional gain lower limit $f_{CP1}(t)$ and a proportional gain upper limit $f_{CP2}(t)$ from the upper/lower limit determining unit 17a. Then, it is determined whether the proportional gain $K_{PA}$ temporarily determined by the temporarily determining unit 12 is smaller than the obtained proportional gain lower limit $f_{CP1}(t)$ (S903). That is, the proportional gain is limited by the lower limit of the time function obtained from the upper/lower limit determining unit 17a.

When $K_{PA}$ is smaller than $f_{CP1}(t)$ in S903, the coefficient limiting unit 14a sets the value of $f_{CP1}(t)$ to $K_{PT}$ as a new proportional gain (S905). On the other hand, when $K_{PA}$ is equal to or larger than $f_{CP1}(t)$ in S903, it is further determined whether the $K_{PA}$ is larger than the proportional gain upper limit $f_{CP2}(t)$ (S904). That is, the proportional gain is limited by the upper limit of the time function obtained from the upper/lower limit determining unit 17a.

When $K_{PA}$ is larger than $f_{CP2}(t)$ in S904, the coefficient limiting unit 14a sets the value of $f_{CP2}(t)$ to $K_{PT}$ as a new proportional gain (S907). On the other hand, when $K_{PA}$ is equal to or smaller than $f_{CP2}(t)$ in S904, the temporarily determined proportional gain $K_{PA}$ is within a range of the upper and lower limits, and $K_{PA}$ is set to $K_{PT}$ as the proportional gain (S906).

Then, the integral gain is determined after the proportional gain. The coefficient limiting unit 14a obtains an integral gain lower limit $f_{CI1}(t)$ and an integral gain upper limit $f_{CI2}(t)$ from the upper/lower limit determining unit 17a. Then, it is determined whether the integral gain $K_{IA}$ temporarily determined by the temporarily determining unit 12 is smaller than the obtained integral gain lower limit $f_{CI1}(t)$ (S908). That is, the integral gain is limited by the lower limit of the time function obtained from the upper/lower limit determining unit 17a.

When $K_{IA}$ is smaller than $f_{CI1}(t)$ in S908, the coefficient limiting unit 14a sets the value of $f_{CI1}(t)$ to $K_{IT}$ as a new integral gain (S910). On the other hand, when $K_{IA}$ is equal to or larger than $f_{CI1}(t)$ in S908, it is further determined whether the $K_{IA}$ is larger than the integral gain upper limit $f_{CI2}(t)$ (S909). That is, the integral gain is limited by the upper limit of the time function obtained from the upper/lower limit determining unit 17a.

When $K_{IA}$ is larger than $f_{CI2}(t)$ in S909, the coefficient limiting unit 14a sets the value of $f_{CI2}(t)$ to $K_{IT}$ as a new integral gain (S912). On the other hand, when $K_{IA}$ is equal to or smaller than $f_{CI2}(t)$ in S909, the temporarily determined integral gain $K_{IA}$ is within a range of the upper and lower limits, and $K_{IA}$ is set to $K_{IT}$ as the integral gain (S911).

The proportional gain $K_{PT}$ and the integral gain $K_{IT}$ determined in these steps described above are set to the actual proportional gain $K_P$ and the actual integral gain $K_I$ (S913), and are passed from the coefficient limiting unit 14a to the drive signal determining unit 16 as the actual control coefficients. The drive signal determining unit 16 calculates a controlled variable based on the deviation obtained from the deviation calculating unit 11 and the actual control coefficients obtained from the coefficient limiting unit 14a (S914).

With the second embodiment, it is possible to improve the convergence by setting the time functions for the upper and lower limits, thereby limiting the control coefficients so as to increase them as time elapses up to a certain time. Further, after a certain time, it is possible to prevent the actual opening from oscillating by limiting the control coefficients so as not to increase excessively again.

Third Embodiment

The case where the upper and lower limits based on the time functions are applied to the temporary control coefficients determined by the temporarily determining unit 12 is described in the second embodiment. In a third embodiment, upper and lower limits are applied based on the number of strokes in the engine. The number of strokes in the engine implies the integral of the number of revolutions in the engine starting from a certain moment, and corresponds to the number of the upward/downward motions of the piston starting from the certain moment. In sampling control, the number of strokes in the engine is obtained by cumulatively counting the number of revolutions in the engine for the sampling period, and converting based on the sampling period.

Figure 10:
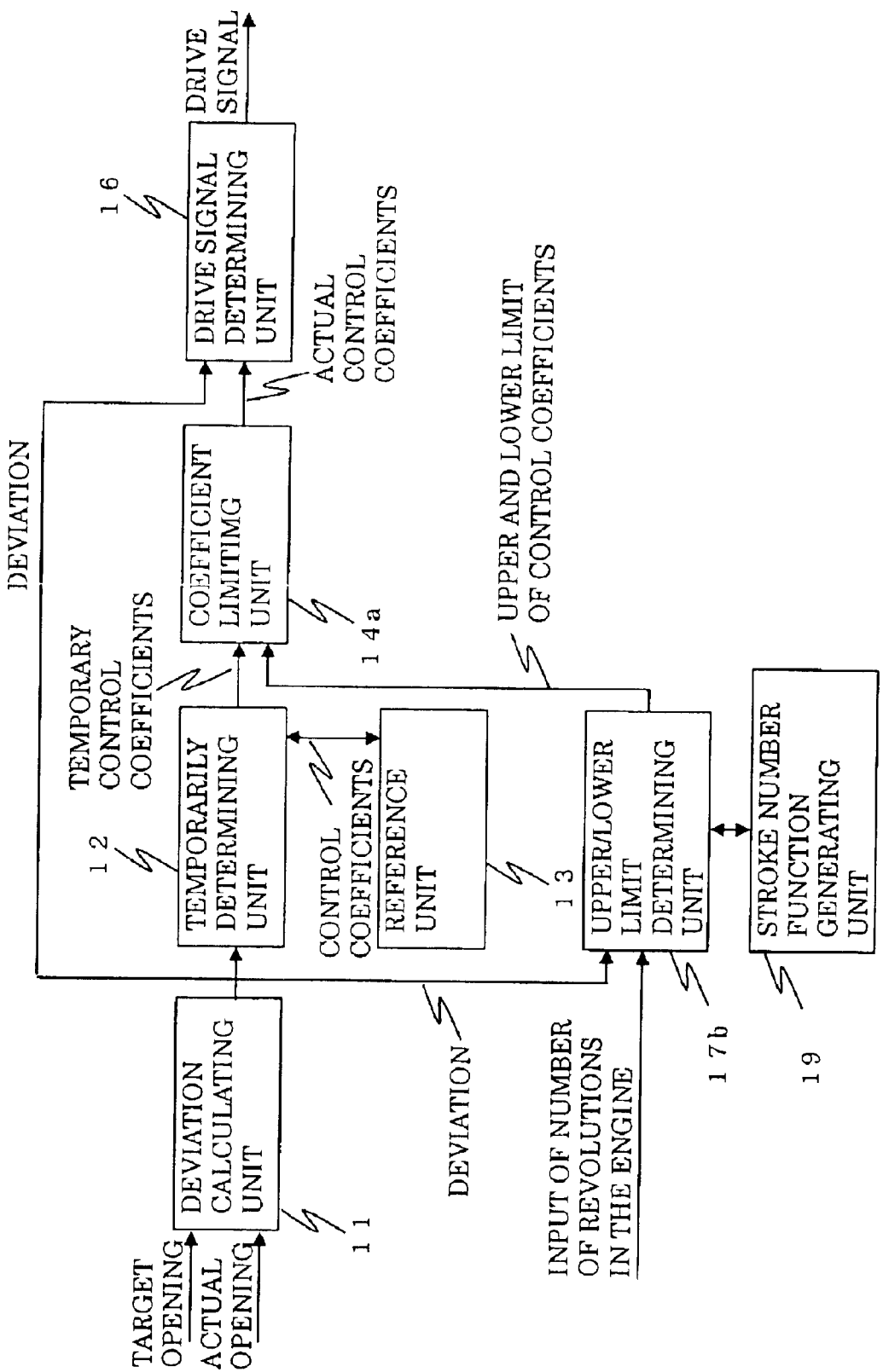
FIG. 10 is an internal block diagram of a throttle valve controller according to a third embodiment of the present invention.

FIG. 10 is an internal block diagram of the throttle valve controller 1 according to the third embodiment of the present invention, and shows a flow of processing inside the throttle valve controller. The same units as those in the internal block diagram of FIG. 7 used for describing the second embodiment are assigned with the same reference numerals, and new constitution elements are detailed.

Figure 11:
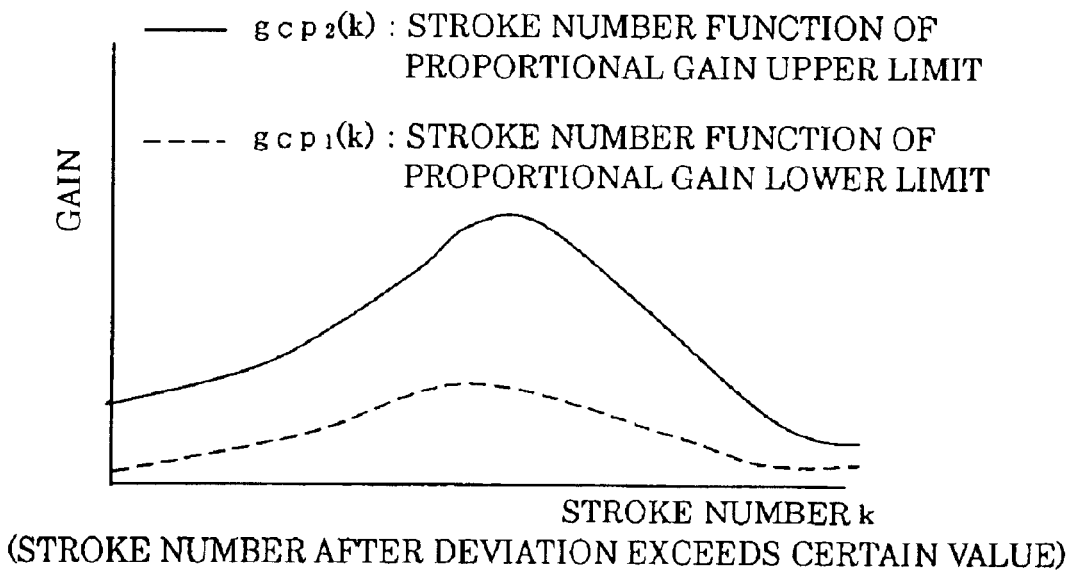
FIG. 11 shows stroke number functions for upper and lower limits of the proportional gain according to the third embodiment of the present invention.

An upper/lower limit determining unit 17b obtains candidates for the upper and lower limits of the control coefficients from a stroke number function generating unit 19 based on the deviation signal obtained from the deviation calculating unit 11, and a number of revolutions in the engine input obtained from a number of revolutions in the engine detecting unit, and outputs these candidates to the coefficient limiting unit 14a. FIG. 11 shows the stroke number functions for the upper and lower limits of the proportional gain according to the third embodiment of the present invention. Based on this chart, data on the upper and lower limits of the proportional gain corresponding to predetermined stroke number data are stored as a map in a stroke number function generating unit 19. For example, the curves for the upper and lower limits in FIG. 11 are poly-line approximated by multiple inflection points, and these inflection points are arranged into a map as the predetermined stroke number data. Alternatively, the stroke number function generating unit 19 may have continuous functions which generate the upper and lower limits according to the stroke number.

Though FIG. 11 does not show, stroke number functions for upper and lower limits of the integral gain are arranged as a map, and are stored in the stroke number function generating unit 19 in advance as the stroke number functions for the proportional gain are. An upper/lower limit determining unit 17b stores in advance a deviation threshold which is used to determine that the stroke number for the stroke number functions is 0 cycle after the deviation exceeds a certain value.

The upper/lower limit determining unit 17b has a feature which compares the deviation obtained from the deviation calculating unit 11 and a deviation threshold stored in advance, and resets the stroke number to 0 cycle when a deviation larger than the deviation threshold is input. The upper/lower limit determining unit 17b further has a feature to input the number of revolutions in the engine from the unillustrated number of revolutions in the engine detecting unit, and calculates the number of strokes in the engine based on the number of revolutions in the engine cumulatively counted in every sampling period.

Further, the upper/lower limit determining unit 17b uses the stroke number data to obtain data on the upper limits and the lower limits of the proportional gain corresponding to the stroke number data on inflection points on both ends of a line segment approximating the stroke number data from the stroke number generating unit 19. Then, the upper and lower limit of the proportional gain are determined by applying linear interpolation so as to obtain data on the upper limit and the lower limit of the proportional gain corresponding to the stroke number data based on the obtained data. Similarly, upper and lower limits of the integral gain are determined. The upper and lower limits of the control coefficients are sent to the coefficient limiting unit 14a.

Then, the coefficient limiting unit 14a applies the upper and lower limits of the control coefficients obtained from the upper/lower limit determining unit 17b to limit the temporary control coefficients obtained from the temporarily determining unit 12, and obtains actual control coefficients to be actually output. Though FIG. 11 does not show, by changing the upper and lower limits, namely increasing the upper limits and decreasing the lower limits, after a certain number of cycles, it is possible to adopt large temporary control coefficients temporarily determined by the temporarily determining unit 12 when a small deviation occurs after a deviation subsides.

Figure 12:
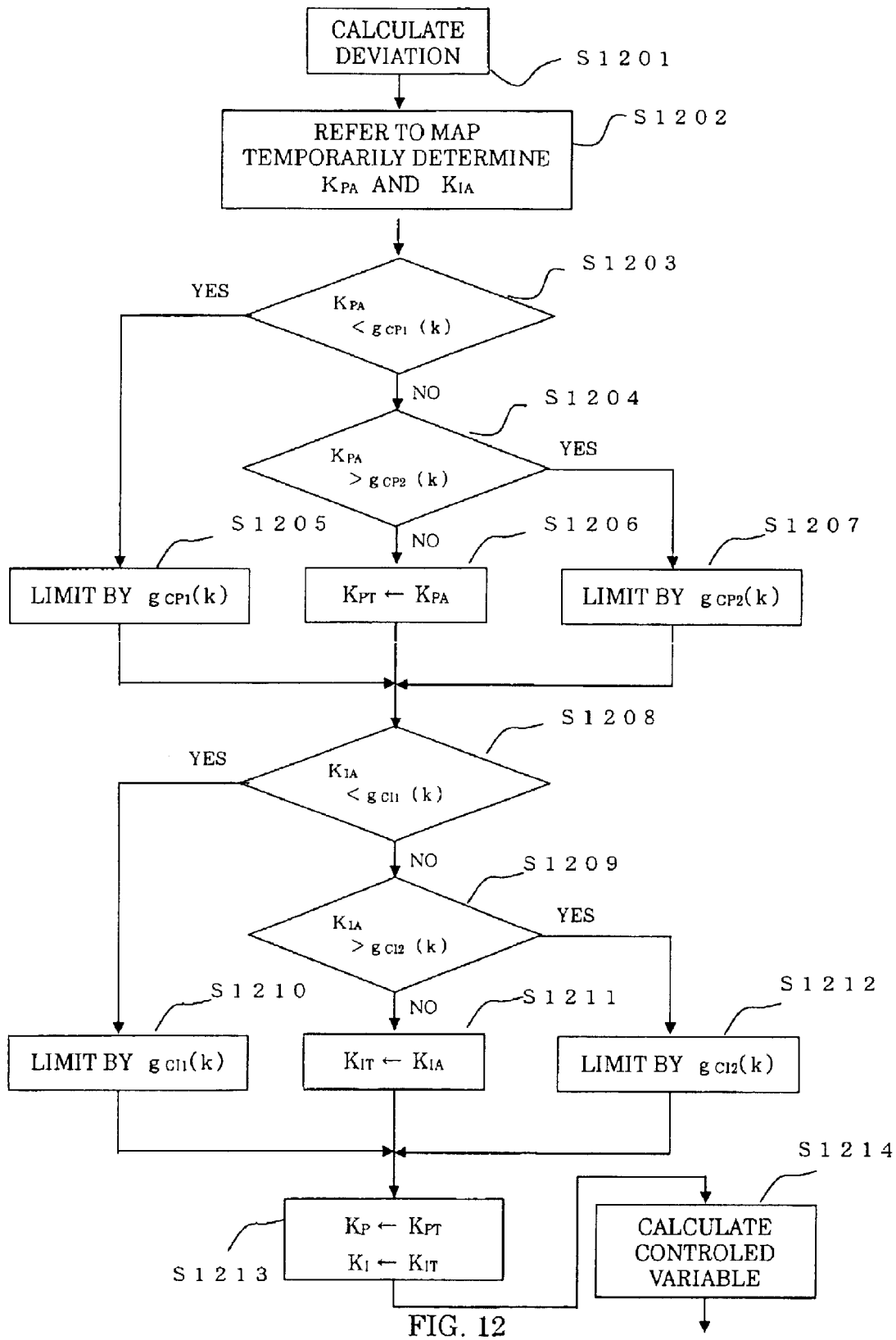
FIG. 12 is a flowchart relating to how to determine the control coefficients according to the third embodiment of the present invention.

FIG. 12 is a flowchart relating to how to determine the control coefficients according to the third embodiment of the present invention. Since the values adopted as the upper and lower limits are simply changed from the time function f(t) in the flowchart in FIG. 9 to the stroke number function g(k), and the content of the processing is identical, description is not provided.

With the third embodiment, it is possible to improve the convergence by setting the stroke number functions for the upper and lower limits, thereby limiting the control coefficients so as to increase them as time elapses up to a certain stroke number. Further, after a certain number of cycles, it is possible to prevent the actual opening from oscillating by limiting the control coefficients so as not to increase excessively again. In addition, it is possible to determine the coefficients more suited to the behavior of the engine by using the number functions whose variable is the number of strokes in the engine to limit the control coefficients.

As described above, the present invention provides the throttle valve control apparatus which simultaneously realizes the quick response and the stability whether the throttle valve gets stuck or not by controlling the throttle valve based on the control coefficients which change as time elapses under the limits.

What is claimed is:

1. A throttle valve control apparatus comprising:
   a deviation calculating unit which calculates a deviation between a target opening and an actual opening of a throttle valve;
   a reference unit which outputs a control coefficient for the individual deviation;
   a temporarily determining unit which refers to the reference unit at a predetermined interval so as to temporarily determine a temporary control coefficient corresponding to the deviation;
   a coefficient limiting unit which determines an actual control coefficient for a present period based on comparing the temporary control coefficient temporarily determined by the temporarily determining unit, with a stored actual control coefficient determined for a previous period;
   a present value storing unit which stores the actual control coefficient determined by the coefficient limiting unit; and
   a drive signal determining unit which determines a drive signal for the throttle valve based on the actual control coefficient obtained from the coefficient limiting unit and the deviation obtained from the deviation calculating unit,
   wherein the coefficient limiting unit has a permissible change predetermined for the change of the control coefficient which changes for a single period, obtains a difference as a change between the temporary control coefficient temporarily determined by the temporarily determining unit and the actual control coefficient for the previous period stored in the present value storing unit at predetermined periods, and limits the obtained change according to the permissible change so as to determine the actual control coefficient for the present period, thereby fitting the change from the actual control coefficient for the previous period to the actual control coefficient for the present period into the permissible change.

2. The throttle valve control apparatus according to claim 1, wherein the drive signal determining unit determines the drive signal by use of a product obtained by multiplying the deviation by the actual control coefficient.

3. The throttle valve control apparatus according to claim 1, wherein the drive signal determining unit determines the drive signal by use of an integral of product obtained by multiplying the deviation by the actual control coefficient.

4. The throttle valve control apparatus according to claim 1, wherein the coefficient limiting unit has a permissible increment used in case for increasing the control coefficient and a permissible decrement used in case for decreasing the control coefficient respectively as the permissible change, uses the permissible increment as the permissible change when the temporary control coefficient temporarily determined by the temporarily determining unit is larger than the actual control coefficient for the previous period stored in the present value storing unit, and uses the permissible decrement as the permissible change when the temporary control coefficient temporarily determined by the temporarily determining unit is smaller than the actual control coefficient for the previous period stored in the present value storing unit, thereby determining the actual control coefficient for the present period.

5. A throttle valve control apparatus comprising:
   a deviation calculating unit which calculates a deviation between a target opening and an actual opening of a throttle valve;
   a reference unit which outputs a control coefficient for the individual deviation;
   a temporarily determining unit which refers to the reference unit at a predetermined interval so as to temporarily determine a temporary control coefficient corresponding to the deviation; and
   a drive signal determining unit which determines a drive signal for the throttle valve based on the temporary control coefficient obtained from the temporarily determining unit and the deviation obtained from the deviation calculating unit,
   the apparatus further comprising:
   a time function generating unit which outputs as a function of an elapsed time starting from a moment when the deviation exceeds a predetermined deviation threshold, upper and lower limits of the control coefficient for the individual elapsed time;
   an upper/lower limit determining unit which has a function of starting measuring the elapsed time when the deviation exceeds the predetermined deviation threshold, and refers to the time function generating unit at a predetermined interval to determine the upper and lower limits of the control coefficient corresponding to the elapsed time; and
   a coefficient limiting unit which applies the upper and lower limits obtained from the upper/lower limit determining unit to the temporary control coefficient temporarily determined by the temporarily determining unit at predetermined periods, thereby determining the actual control coefficient for a present period,
   wherein the drive signal determining unit determines the drive signal for the throttle valve based on the actual control coefficient obtained from the coefficient limiting unit and the deviation obtained from the deviation calculating unit.

6. A throttle valve control apparatus comprising:
   a deviation calculating unit which calculates a deviation between a target opening and an actual opening of a throttle valve;
   a reference unit which outputs a control coefficient for the individual deviation;
   a temporarily determining unit which refers to the reference unit at a predetermined interval so as to temporarily determine a temporary control coefficient corresponding to the deviation; and a drive signal determining unit which determines a drive signal for the throttle valve based on the temporary control coefficient obtained from the temporarily determining unit and the deviation obtained from the deviation calculating unit, the apparatus further comprising:

a stroke number function generating unit which outputs as a stroke number function of a number of strokes in the engine corresponding to the integral of the number of revolutions in the engine, upper and lower limits of the control coefficient for the individual stroke number;

an upper/lower limit determining unit which has a function of starting measuring the number of strokes in the engine corresponding to the integral of the number of revolutions in the engine when the deviation exceeds a predetermined deviation threshold, and refers to the stroke number function generating unit at a predetermined interval to determine the upper and lower limits of the control coefficient corresponding to the number of strokes in the engine; and a coefficient limiting unit which applies the upper and lower limits obtained from the upper/lower limit determining unit to the temporary control coefficient temporarily determined by the temporarily determining unit at predetermined periods, thereby determining the actual control coefficient for a present period, wherein the drive signal determining unit determines the drive signal for the throttle valve based on the actual control coefficient obtained from the coefficient limiting unit and the deviation obtained from the deviation calculating unit.

* * * * *